Oct. 11, 1960   I. FRIEDLAND ET AL   2,955,585
PNEUMATIC SUBCALIBER MORTAR TRAINER
Filed April 15, 1957   10 Sheets-Sheet 1

INVENTORS
IRWIN FRIEDLAND
CLEBURNE B. HATFIELD
BY
*W.R. Maltby*
*Lawrence S. Epstein*
ATTORNEYS

INVENTORS
IRWIN FRIEDLAND
CLEBURNE B. HATFIELD
ATTORNEYS

INVENTORS
IRWIN FRIEDLAND
BY CLEBURNE B. HATFIELD
ATTORNEYS

Oct. 11, 1960     I. FRIEDLAND ET AL     2,955,585
PNEUMATIC SUBCALIBER MORTAR TRAINER
Filed April 15, 1957     10 Sheets-Sheet 7

*INVENTORS*
*IRWIN FRIEDLAND*
*CLEBURNE B. HATFIELD*
BY
*ATTORNEYS*

INVENTORS
IRWIN FRIEDLAND
CLEBURNE B. HATFIELD
BY
W.R. Malloy
Lawrence S. Epstein
ATTORNEYS

FIG. 19

2,955,585
Patented Oct. 11, 1960

United States Patent Office

2,955,585

PNEUMATIC SUBCALIBER MORTAR TRAINER

Irwin Friedland, 588 E. 93rd St., Brooklyn, N.Y., and Cleburne B. Hatfield, 320 E. 42nd St., New York, N.Y.

Filed Apr. 15, 1957, Ser. No. 653,045

6 Claims. (Cl. 124—11)

(Granted under Title 35, U.S. Code (1952), sec. 266)

The invention described herein may be manufactured and used by or for the Government of the United States of America for governmental purposes without the payment of any royalties thereon or therefor.

This invention relates to devices utilized in training military personnel in the operation thereof and more particularly relates to pneumatically actuated subcaliber mortar apparatus means attached to operational mortar equipment. A subcaliber missile is loaded and fired in a realistically simulated manner.

Existing devices utilized for training purposes contain many objectional features and are inadequate in use. For example, one such device utilizes 22 caliber blank cartridges to propel the subcaliber shell from the subcaliber barrel. The subcaliber barrel and shell become fouled and dirty due to the blank powder charge. Frequent cleaning is necessary. Such blank ammunition is costly and on occasion is difficult to obtain. Misfires occur and accuracy in the range of the subcaliber missile is poor due to the difficulty of obtaining uniformly made ammunition. Since the blanks contain only about 1.2 grains of ammunition, a small variation in gram size and weight will greatly affect accuracy.

An improved device utilizes compressed air to propel the subcaliber motor shell. In order for this device to operate, a solenoid operated valve was triggered when the subcaliber shell activated a microswitch. Propellant air was metered by an electric timer. A source of current (batteries for portable use or line voltage indoors) was required. The device was also unduly bulky and cumbersome because of the need for batteries, timer motor, etc.

The instant invention overcomes the deficiencies of the prior art in eliminating the use of cartridge blanks and electrical current. Humidity and temperature now have no effect and so do not influence range. This increases the accuracy of firing and provides more realistic training.

The object of the invention is to provide a realistic simulation of the firing of an operational missile.

Another object is to provide a military training device which does not require the use of ammunition but achieves the same effect for training purposes by substitute means.

By avoiding the use of powder ammunition, fouling of the training device is eliminated. It is therefore another object of the invention to provide a training device that is available for constant use with virtually no necessity for cleaning and repair.

It is another object to provide a training device where the range of the subcaliber missile is carefully and accurately controlled.

It is still another object to provide a device that is inexpensive to make and to operate and is readily adapted for connection with operational equipment.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
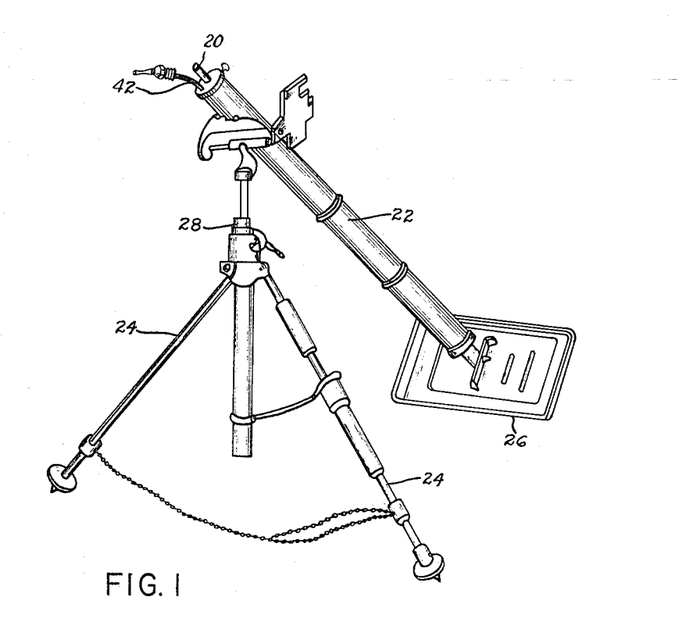
Fig. 1 is a perspective view of the subcaliber mortar device mounted in an operational mortar gun.

The subcaliber mortar 20 of the invention is of smaller bore than mortar gun 22 and is illustrated as mounted therein in Fig. 1. Mortar 22 is pivotally and adjustably mounted on the bipod legs 24 and the base plate 26. Angular adjustment and deflection are provided by the sight-setting mechanism 28. Subcaliber mortar 20 is capable of projecting a subcaliber missile in close simulation of actual mortar fire. Since the mounting means is well known and forms no part of this invention, further detailed description is omitted. Thus, when the subcaliber projectile, or mortar shell 30 is fired (see Fig. 4), it appears to be shot actually from mortar gun 22. The training afforded by this type of construction is superior to prior devices which mounted the subcaliber device on the exterior of the mortar gun.

Figure 2:
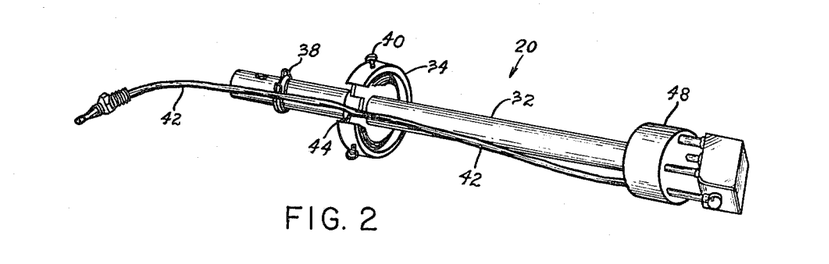
Fig. 2 is a perspective view of a subcaliber mortar with the parts assembled and ready for insertion into a mortar gun.

As is apparent from Fig. 2, the subcaliber mortar gun 20 is provided with an elongated barrel member 32, of a length sufficient to extend slightly beyond the mouth of the mortar gun 22 when inserted therein. An adapter cap 34, containing a central opening 36, is fitted over the front end of the subcaliber barrel and is held in position by the snap rings 38. The diameter of adapter 34 is large enough to fit over the mouth of the operational mortar gun and is secured thereto by means of clamps 40. The air hose line 42 extends through a slot 44 in the adapter and through the mortar chamber 46, terminating in the trigger housing body member 48.

Figure 3:
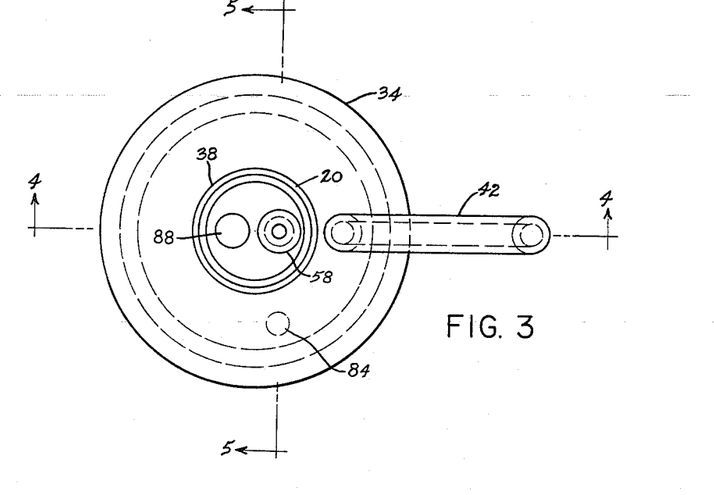
Fig. 3 is a plan view of one form of the invention.
Figures 4, 5:
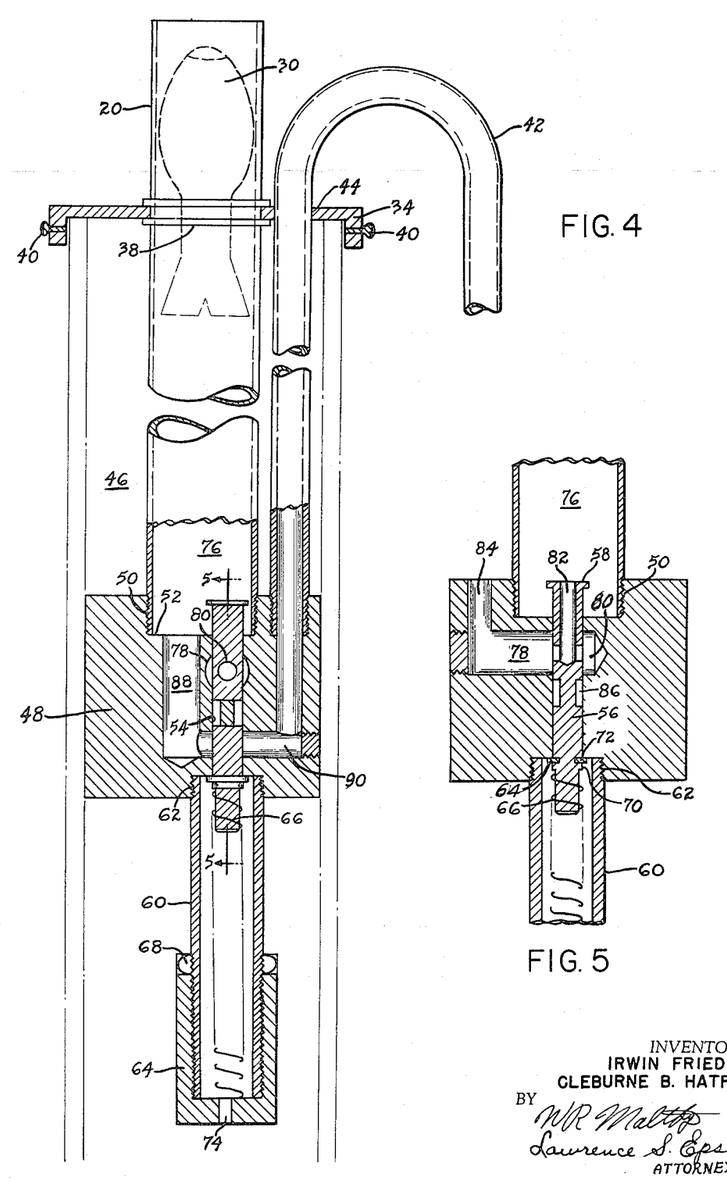
Fig. 4 is a vertical section of the subcaliber mortar trainer and is taken on line 4—4 of Fig. 3.
Fig. 5 is also a vertical section of the trainer taken on line 5—5 of Fig. 4.

Referring to Figs. 3–5, the trigger housing construction is shown in detail. The housing 48 is provided with an internally threaded bore chamber 50 extending a short distance therein and provided with a stop shoulder 52 in order to receive the threaded end of the subcaliber barrel 20 secured thereto. The trigger housing is designed to provide a sliding fit within the walls of the mortar barrel and together with the adapter cap 34 maintains the subcaliber barrel in fixed position.

A passage 54 extends through the vertical plane of the trigger housing and terminates in the chamber 50. A trigger valve stem 56 extends through the passage and into the chamber 50 and is provided with a valve head 58. The valve stem 56 also extends beyond the opposite end of passage 54 into a spring housing 60, the latter being threaded at 62 into the trigger housing 48. An adjustable stop member 64 is mounted on the spring housing 60 and is adjustable to vary the tension of spring 66. Lock nut 68 retains stop 64 in adjusted position. The compression spring 66 extends through the housing 60 and around the free end of the stem 56 to seat against the stem shoulder 70. A snap ring 72 on the stem 66 limits the upward movement of the valve stem. A vent 74 for the spring 66 is provided.

When a subcaliber missile is dropped into barrel 20, the air in the barrel chamber 76 would be compressed and cushion the free fall of the missile so that it would reach the bottom of the barrel with difficulty, or not at all. To avoid this situation, a passage or chamber 78 extends transversely through the trigger housing shortly below the barrel 20 to a point slightly beyond the valve stem 56. The port means 80 in the valve stem 56 exits into the chamber 78 and connects, by means of the valve stem passageway 82, with the barrel chamber 76. This allows air to be forced through the subcaliber barrel chamber 76, through the transverse passage 78 and to the mortar gun chamber 46 by means of outlet 84. The subcaliber missile falls freely through the barrel chamber 76 and strikes the valve stem head 58. The barrel stem 56 is urged downwardly in the passage 54 against the force of the spring 66 until the annular groove 86 in the valve stem registers with the passageway 88 leading into the subcaliber mortar missile barrel. Air at about 90 lbs. p.s.i. pressure escapes from connecting passageway 90 through the annular opening 86 and the passageway 88 into the chamber 50. The pressure used will depend on the range desired for the subcaliber missile.

The operation of the subcaliber mortar training device is readily apparent from the above description. The subcaliber barrel 20 is threaded into the chamber 50 in the trigger housing member 48. Compressed air is supplied to the conduit 42 and fills passageway 90, being prevented from escaping into the passageway 88 by the valve stem 56 slidably retained in the vertically extending valve housing or passage 54. The annular groove 86 is normally retained out of registry with the compressed air passageways 88 and 90 by means of the return spring 66. At the same time, the air exhaust port 80 is aligned with exhaust passageway 84. The members 72 and 58 are the stop means to provide the upper and lower limits of travel for the valve stem 56.

When the subcaliber missile 30 is dropped into the subcaliber barrel chamber 76, the air in the chamber is forced out through the passageway 82 in the upper portion of the valve 56 and out through exit 84 into the operational mortar gun barrel. The subcaliber missile strikes the stem 56 and causes the valve stem to slide downwardly, bringing the groove 86 into alignment with the passages 88 and 90. This simultaneously closes off the air exhaust chamber 78. Compressed air escapes through the passage 88 and into the barrel 76 containing the subcaliber missile, which is then ejected in close simulation to the firing of a mortar gun. The range of the subcaliber missile is controlled by the pressure of the ejecting medium. When the missile has been fired, the valve 56 is returned to its original position through the force of the spring 66.

The basic method of exhausting the air in the subcaliber barrel prior to supplying the means for ejecting the missile can be carried out in other structures. In the modification described above, pressure is exerted on one side of the valve only and friction may be encountered when high pressures are applied. At lower pressures of up to about 90 lbs. p.s.i., there is no friction effect. However, as pressures exceed about 100 p.s.i., the valve moves slowly, being retarded by friction encountered under such air pressure.

Figure 6A:
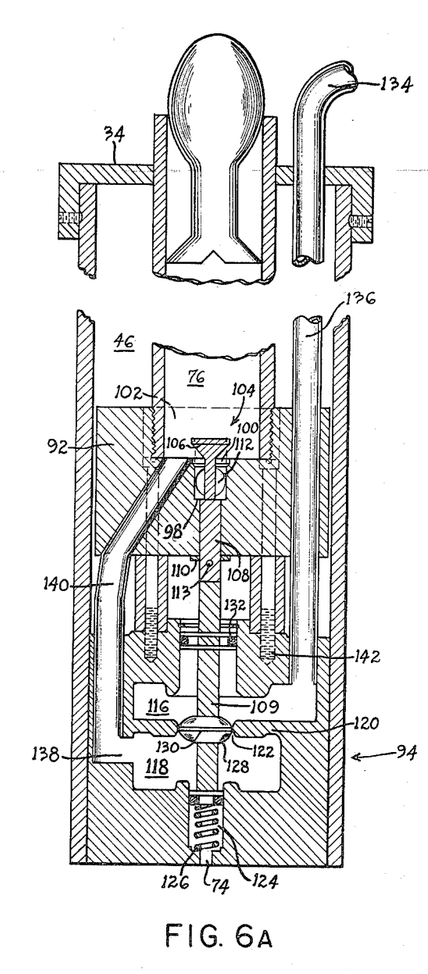
Fig. 6a is a vertical section, partly broken away, of another form of the invention.
Figure 6B:
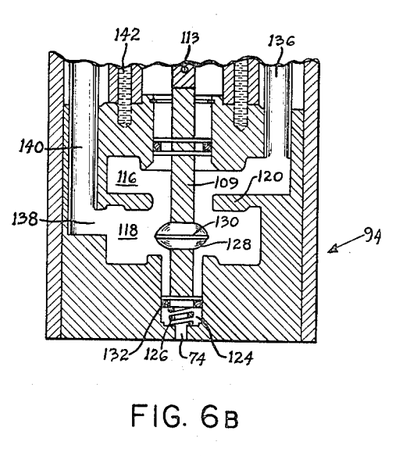
Fig. 6b is similar to 6a, but with the valve in the unseated position.
Figure 7:
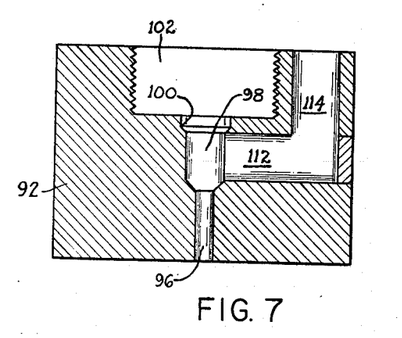
Fig. 7 is an enlarged detail of Fig. 6 and illustrates the air venting means for the subcaliber missile.
Figure 8:
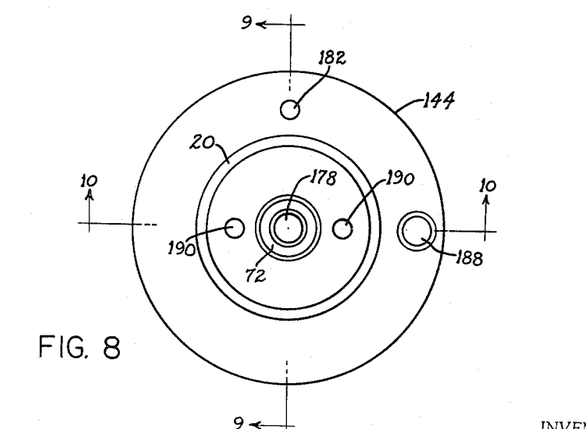
Fig. 8 is a plan view of still another form of the invention.
Figure 9:
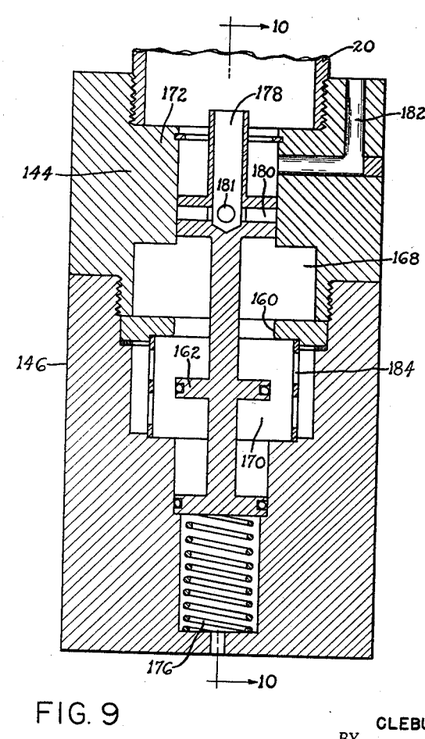
Fig. 9 is a vertical section taken on line 9—9 of Fig. 8.
Figure 10:
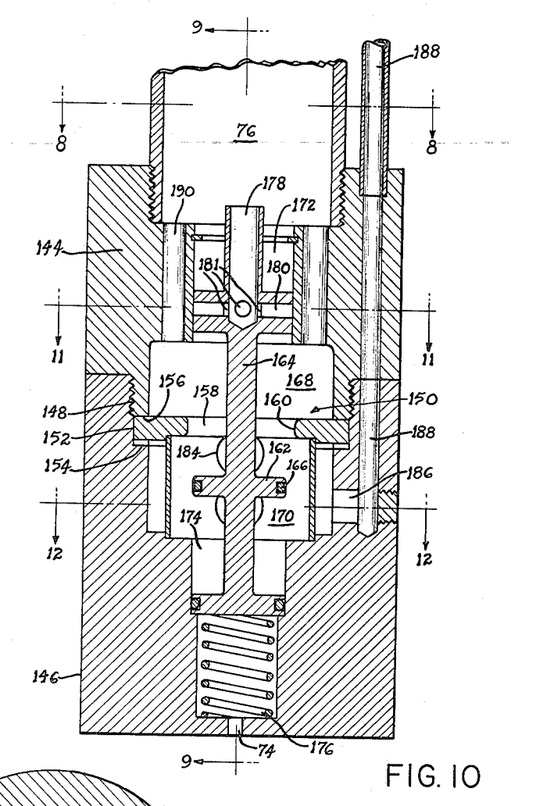
Fig. 10 is also a vertical section taken on line 10—10 of Fig. 9.
Figure 11:
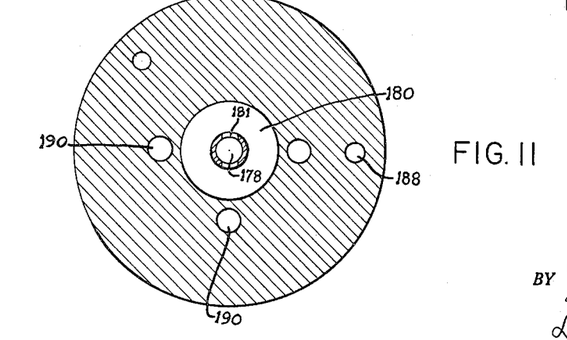
Fig. 11 is a horizontal sectional view taken on line 11—11 of Fig. 10 and illustrates the air venting means for the missile.
Figure 12:
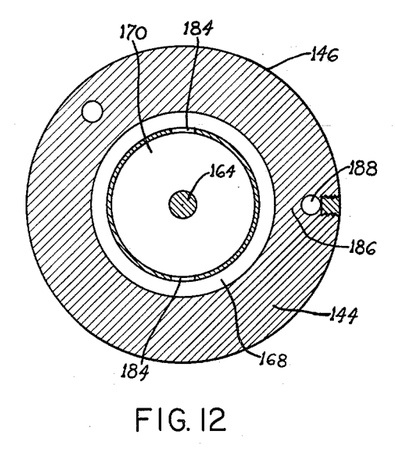
Fig. 12 is a horizontal section taken on line 12—12 of Fig. 10 and illustrates the means for supplying air to the missile.

This is readily eliminated by means of the valve structure in Figs. 6 and 7. The subcaliber mortar gun is similar in construction to that of Figs. 1–5 except that the trigger assembly 92 is modified to utilize an air pressure valve body housing 94 that is designed to provide uniform air pressure on all sides of the valve stem 108. Friction due to uneven pressure as found in Figs. 3–5 is thereby eliminated. Through this pneumatically balanced construction, no more pressure is required to actuate the valve stem at elevated pressures than is required at zero pressure.

The trigger assembly 92 is provided with a vertical passageway 96 which terminates in a poppet valve chamber 98 having a valve seat 100. A large bore in trigger housing 92 provides a chamber 102 connecting with the subcaliber barrel chamber 76. The subcaliber barrel 20 threadedly seats in chamber 102 in a manner similar to the first embodiment described. The poppet valve 104 comprises a tapered valve head 106 adapted to seat in the valve seat 100 and a valve stem 108 extending through the chamber 98 and through the passageway 96. The valve stem 108 terminates on the upper surface of the stem 109, the latter normally urging the valve head out of engagement with the valve seat. A ring washer 110, held on the stem 108 by any suitable means such as a cotter pin 113, provides stop means for the upward movement of the poppet valve stem. A transverse passageway 112 connects the chamber 98 with an air escape port 114 venting into the chamber 46.

The compressed air valve housing 94 contains an entry air chamber 116 and a release chamber 118 separated at 120 from each other except through an axial opening 122 through which the valve stem 109 extends. The valve stem 109 extends through the valve housing 94 and terminates in the spring chamber 124. The return spring 126 urges the valve stem upwardly into the position shown in Fig. 6a so that a disc valve 128, secured on the valve stem, normally closes the axial opening 122 to prevent compressed air from entering the chamber 118 until the missile is to be ejected. A sealing gasket 130 eliminates leakage of air. The sealing rings 132 on the valve stem effectively maintain the valve housing 94 as an airtight unit. The chamber 116 is connected to a compressed air source conduit 134 through the conduit 136. The valve port 138, in turn, connects the exit chamber 118 with a conduit 140, leading through the trigger housing 92 and terminating adjacent the poppet valve 104.

When a subcaliber missile is dropped into the subcaliber barrel 76, air in the tube is forced out of outlet 114, thereby allowing free fall for the missile. On striking the poppet valve 104, the valve head 106 is moved downwardly against the force of the spring 126 to seat in the valve seat 100. The air in the subcaliber barrel has been exhausted through the outlet 114 and air under pressure is admitted to eject the missile, but cannot escape through the now closed poppet valve. Movement of the poppet valve simultaneously moves the valve stem 109, freeing the valve 128 from its seat and enabling the air under pressure in the chamber 116 to enter the chamber 118 and continue through the conduit 140 into the subcaliber barrel chamber 76. The missile is fired in close simulation of actual mortar shells. As soon as the missile is ejected, the valves 128 and 104 are returned automatically to their ready position. Since the inlet chamber 116 of the valve 94 is annular in construction, uniform pressure is applied against the stem 109 and it will move instantaneously when the poppet valve 104 slides downwardly, thereby unseating the valve 128. The pneumatically balanced valve stem 109 has only to overcome the force exerted by the valve spring 126. When the missile projectile 1 is propelled from the barrel 76, the propelling air pressure through conduit 140 is now vented to the atmosphere. Consequently the valve stem 109 is immediately returned to the sealed position, Fig. 6a, by spring 126.

The trigger valve assembly 92 and the air pressure valve housing 94 may be an integral unit, or may be separately manufactured and secured permanently together by means of connecting bolts 142 or similar fastening means.

A valve construction combining the features of Figs. 3–7 is illustrated in Figs. 8–12. In this modification, a special connecting conduit with the subcaliber barrel chamber 76 is eliminated and a plurality of air supply means is provided to supply uniform pressure to the subcaliber missile to increase efficiency in ejection and control.

The trigger valve housing 144 is coupled to the air pressure valve housing 146 by suitable means 148 to form a single unit to be inserted in the mortar gun 22.

A large axial chamber 150 is subdivided by means of a dividing wall 152 retained on a shoulder 154 of the valve housing 146 by the rim 156 of the valve housing 144. An axial opening 158 in the wall member 152 provides an annular valve seat 160 for the valve 162 on the unitary valve stem 164. A sealing ring 166 prevents the leakage of air between the upper chamber 168 and the lower chamber 170. The valve stem 164 is slidably retained in a housing 172 and in a spring housing 174. A spring 176 constantly urges the valve 162 into seating position at 160.

The upper end of the valve stem in the housing 172 is modified to provide air escape means for air from the subcaliber missile barrel 76 secured in the trigger valve housing 144. An axial bore 178 extending into the enlarged free end of the valve stem 164 joins the transverse annular opening 180 through apertures 181 which connects with the L-shaped air relief passage 182. (See Fig. 9.)

The valve is illustrated in the figures at the point of admitting compressed air to eject the subcaliber missile and therefore the annular opening 180 is out of registry with the escape port 182. This occurs after the subcaliber missile has completed descent into the subcaliber barrel and has pushed the valve stem 164 downwardly.

Air under pressure is maintained in the lower chamber 170 by means of the openings 184 connecting through port 186 with a service conduit 188 to a source of air supply (not shown). With the valve 162 unseated, air enters the chamber 168 and travels through the conduits 190 into the barrel 20 to eject the subcaliber missile. With the air being supplied uniformly to the bottom of the missile, a frictionless firing thereof takes place. With the missile fired, the valve 64 is returned to the starting position by the spring 176.

Figure 15:
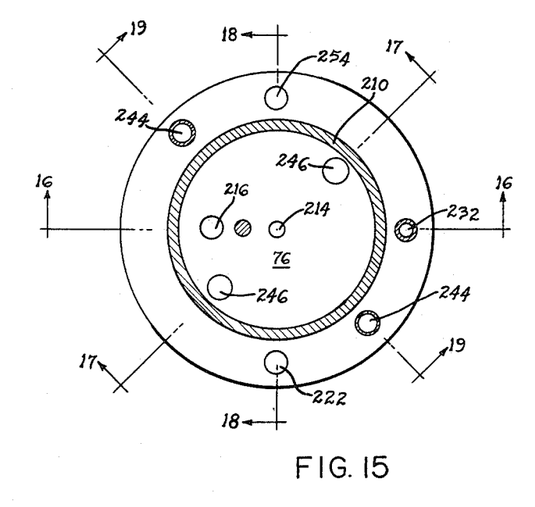
Fig. 15 is a plan view of another form of the invention.

In another form of the invention, a spring controlled poppet valve is actuated to supply air under pressure sufficient to operate the main air supply valve to eject the subcaliber missile. The subcaliber missile barrel 210 is secured in a trigger housing body member 212 in a manner similar to the body member 48 of Fig. 4.

Figure 18:
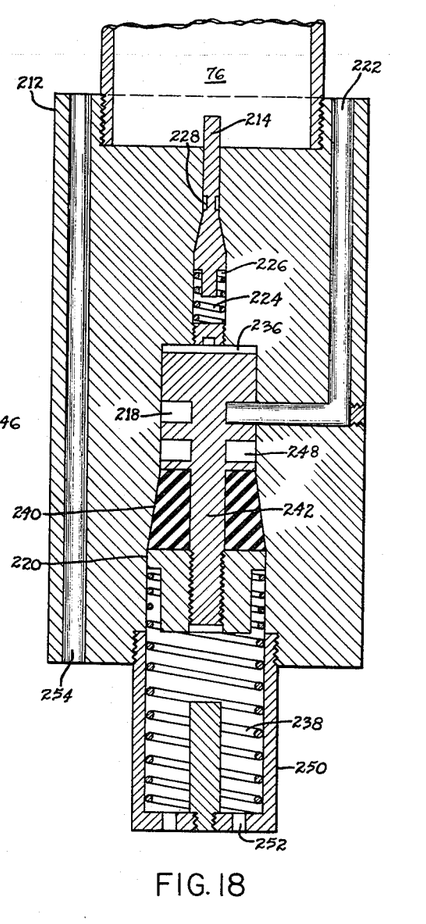
Fig. 18 is a section taken on line 18—18 of Fig. 15.

The subcaliber mortar missile is dropped down the gun barrel and engages the poppet valve 214. In this form of the invention, an air bleeder conduit 216 (Fig. 16) communicates with an annular port 218 in the air pressure valve 220. The port 218 also communicates with the air exit conduit 222 (Fig. 18). Thus, air is not trapped in the subcaliber barrel when the missile is dropped therein.

Figure 16:
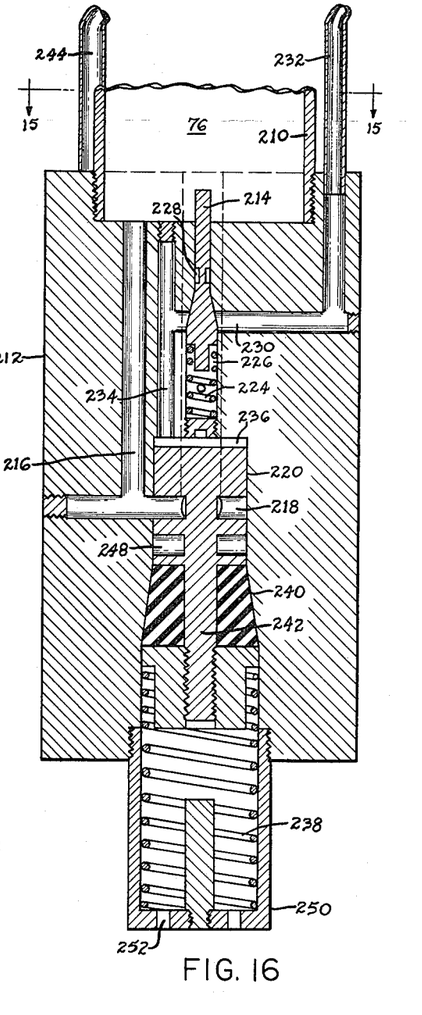
Fig. 16 is a section taken on line 16—16 of Fig. 15.

When the subcaliber shell or missile strikes the poppet valve 214, the force is sufficient to overcome the force of the compression spring 224 retained in a housing 226 within the trigger housing body 212. The poppet valve 214 is moved downwardly by the weight of the missile until the annular port 228 in the valve stem registers with a conduit 230 connected to a low air pressure supply hose line 232. The conduit 230 extends beyond the annular port 228 to communicate with a vertically extending passage 234. The passage 234 terminates in an enlarged chamber 236 housing the air pressure valve 220. (Fig. 16.) In this manner, the air (at about 20 lbs. pressure) supplied to the conduit 230 passes through the port 228 into the passage 234 and exerts sufficient pressure on the valve 220 to move the valve downwardly against the force of the spring 238.

Figure 17:
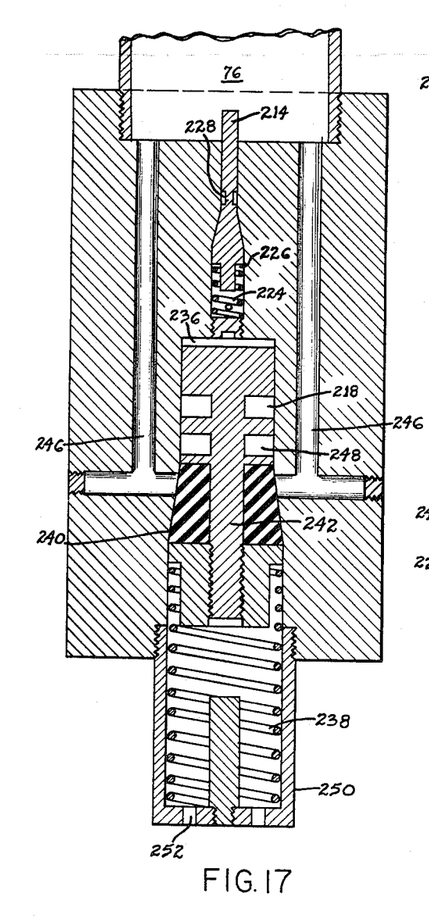
Fig. 17 is a section taken on line 17—17 of Fig. 15.
Figure 19:
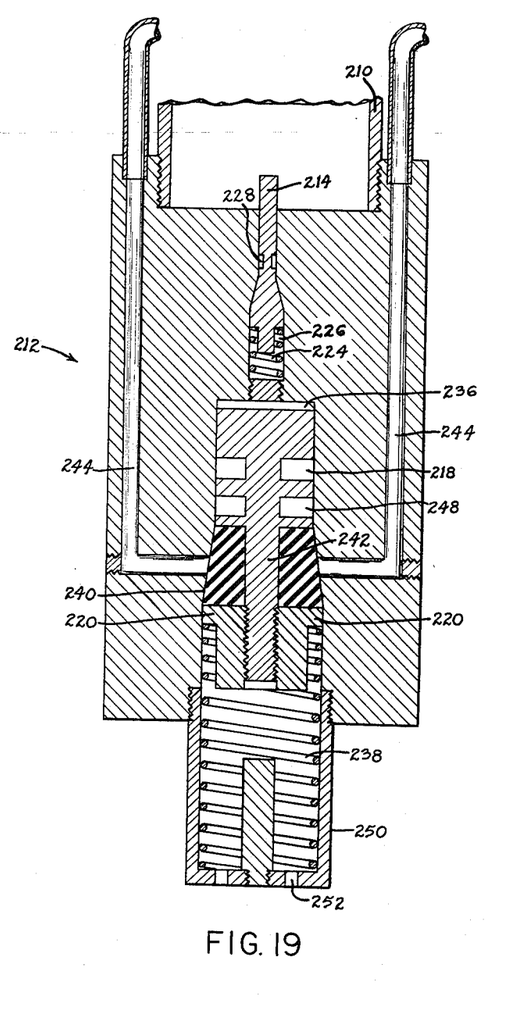
Fig. 19 is a section taken on line 19—19 of Fig. 15.

An annular tapered rubber valve member 240, retained on a reduced portion of the valve stem 242, normally seals the compressed air supply conduits 244 (Fig. 19) from communication with the connecting passages 246 (Fig. 17) extending through the trigger housing body member and connecting with the interior of the subcaliber barrel. When the valve is unseated through movement of the valve body 220, the conduits 244 register with the annular port means 248 to provide direct communication through the passage 246 with the subcaliber missile. The spring 238 is retained in a housing 250. Escape vents 252 communicate with the atmosphere by means of a conduit 254.

The operation is similar to that previously described. In this embodiment, however, it is air under pressure that supplies the force to overcome the normally closed position of the missile ejection supply means.

The invention has many applications. It is used to train a mortar crew and to teach the conduct of fire. It can be utilized on ranges in armories and outdoors. In the training of military personnel it trains the forward observer in reporting new targets, the issuance of fire requests, sensing, and the adjustment of fire. It functions to train in laying the mortar, in sight setting, or in the correct method of loading the mortar and in the proper use of mortar range tables.

Figure 13:
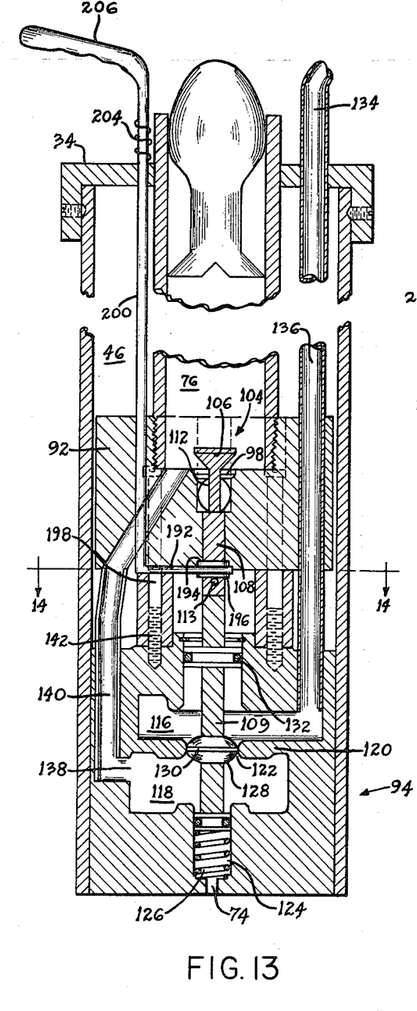
Fig. 13 is a view similar to Fig. 6a, but illustrates the invention adapted for use as a mortar trainer.
Figure 14:
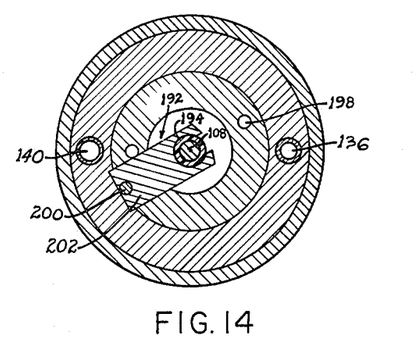
Fig. 14 is a plan view taken on line 14—14 of Fig. 13.

With but slight modification, the invention can be adapted for use as a howitzer trainer. In Figs. 13 and 14 such an adaptation is illustrated. The structure is identical with that of Fig. 6a, except that a U-shaped trigger member 192 is positioned between the two washers 194 and 196. Where provision is made for use of the connecting screws 142, one of the bored passageways 198 is utilized to receive therethrough the firing rod 200. If desired, a passage for the trigger rod, extending over the end of the trigger member 192, is provided. The rod 200 is normally maintained out of engagement with the large platform surface 202 of the trigger 192 by means of the spring 204 retained on the upper portion of the rod 202, between the handle 206 and the adapter cap 34. The valve stem 108 is also modified to terminate at the chamber 98 (see Fig. 6a) so that a subcaliber missile will not automatically open the compressed air valve 128.

An operational howitzer is always manually triggered, and by this modification, the same results are obtained in training. The angle of elevation in a howitzer is less than 45°. The shell is therefore rammed into position, rather than dropped down, as is done with a mortar shell. After a shell has been positioned in the subcaliber chamber, the firing rod 200 is pushed down, causing the rod end to engage the extending platform edge 202 of the trigger means 192 to slide the shortened poppet valve 106 downwardly. This serves to move the valve stem 109 downwardly to open the passage 122, thereby supplying the compressed air to the chamber 76 to eject the missile. The closing operation is similar to that described before. This construction is also adapted for use to eject mortar shells which jam in the subcaliber barrel. One advantage to be found in the invention is that operational firing tables can be utilized. These tables are scaled proportionately to the range desired for the subcaliber missile and is possible only because of the accuracy obtained in firing. Previous subcaliber missiles had an accuracy of ±15 feet at 100 foot range. The instant device has an accuracy of ±6 inches at 100 foot range. Thus, existing devices, when range was changed proportionately to operational distance, had so great a probable error that the subcaliber missile could not be used effectively. In the present invention, the subcaliber missile has a scaled down probable error of the same, or less probable error of operational weapons and has been officially adopted by the Armed Forces.

The invention is not limited to military training, but can be utilized as an educational amusement toy. The superior accuracy obtained over the use of blank cartridges, without the utilization of current, but through balanced pneumatic means, alone makes the invention a valuable aid in the training field.

Obviously many modifications and variations of the present invention are possible in the light of the above teachings. It is therefore to be understood that within the scope of the appended claims the invention may be practiced otherwise than as specifically described.

What we claim is:

1. A pneumatically operated subcaliber mortar gun trainer comprising a trigger housing body member, a subcaliber mortar barrel receiving chamber in said trigger housing body member, a poppet valve slidably mounted in said trigger housing body member and extending into said receiving chamber, an air exhaust chamber having valve seating means communicating with said subcaliber barrel receiving chamber, an air supply conduit extending through said trigger housing member; an air pressure valve housing secured to said trigger housing member, a compressed air storage chamber in said valve housing communicating with said air supply conduit, a compressed air release chamber in said pressure valve housing, port means between said chambers, a valve stem movably mounted in said air pressure valve housing and extending through said port means and engaging said poppet valve, valve means mounted on said stem, spring means in said air pressure valve housing normally urging said valve into said port means into seated position and said poppet valve into unseated position and means connecting said release chamber and subcaliber mortar barrel receiving chamber to supply compressed air to fire a subcaliber mortar shell.

2. A pneumatically operated subcaliber mortar gun trainer comprising a trigger housing body member, a subcaliber missile barrel connected to said trigger housing body member, a valve housing member secured to said trigger housing body member, a valve including a valve stem means in said valve housing member and extending into said trigger housing body member, means to exhaust air to the atmosphere connected to said valve, means to supply air under pressure connected to said valve housing member, means connecting said valve housing member supply means and said subcaliber missile barrel, and means in said valve housing member normally urging said air exhaust means into operative position while urging the air supply means into non-operative position whereby a subcaliber mortar missile sequentially exhausts the air from the subcaliber missile barrel, closes the exhaust air means and opens the connecting means between the air supply means and the subcaliber missile barrel.

3. The combination of claim 2 wherein said valve includes a valve chamber, a valve seat in said chamber, a valve stem means extending through said valve chamber and into said trigger housing body member and a valve member on said stem normally seated in said valve seat to retain the air under pressure in the chamber.

4. A pneumatically operated subcaliber mortar gun trainer comprising a trigger housing body member, a subcaliber mortar barrel receiving chamber mounted in said trigger housing body member, a compressed air valve housing secured to said trigger housing body member, an air entry chamber and an air release chamber in said air valve housing, port means between said last named chambers, unitary actuating means extending through said air valve housing and trigger housing body member, a poppet valve mounted on said unitary actuating means and extending into said subcaliber mortar barrel receiving chamber in an unseated position to be actuated by a subcaliber missile into seated position, means on said unitary actuating means normally closing said port means whereby seating of said poppet valve automatically unseats said port closing means to release compressed air, and means connecting said subcaliber mortar barrel receiving chamber and said air release chamber providing a passage for compressed air to fire a subcaliber missile.

5. A pneumatically operated subcaliber mortar gun trainer comprising a trigger housing body member, a compressed air valve housing positioned in spaced relation to said trigger housing body member, a valve stem means extending through said trigger housing body member and said air valve housing, an air storage chamber and an air release chamber in said air valve housing, air supply means in said air storage chamber, a first valve on said stem means normally separating the chambers, a second valve on said stem means in said trigger housing body member and normally in an unseated position, air exhaust means connected with said second valve and means connecting said air release chamber and said trigger housing body member, whereby when a subcaliber missile is dropped on said second valve said valve is seated and said first valve is automatically unseated, allowing air to escape from the storage chamber into the release chamber and to the trigger housing body member to fire the subcaliber missile, thereby returning the valves to their original position.

6. The structure of claim 5 wherein said second valve is slidably seated in an enlarged chamber portion providing a space therearound, and said air exhaust means connects directly into said space for direct removal of air, and said stem and valves are axially aligned.

References Cited in the file of this patent

UNITED STATES PATENTS

| | | |
|---|---|---|
| 1,234,603 | Aylwin | July 24, 1917 |
| 1,335,448 | Menon | Mar. 30, 1920 |
| 2,308,798 | Peiker | Jan. 19, 1943 |
| 2,526,018 | Foster | Oct. 17, 1950 |
| 2,600,116 | Kipf | June 10, 1952 |
| 2,809,624 | Becher | Oct. 15, 1957 |